United States Patent
Landstad et al.

(10) Patent No.: US 8,009,916 B2
(45) Date of Patent: *Aug. 30, 2011

(54) INK RECOGNITION FOR USE IN CHARACTER-BASED APPLICATIONS

(75) Inventors: Todd Murray Landstad, Sammamish, WA (US); Arin J. Goldberg, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

This patent is subject to a terminal disclaimer.

(21) Appl. No.: 11/530,259

(22) Filed: Sep. 8, 2006

(65) Prior Publication Data

US 2007/0003144 A1    Jan. 4, 2007

Related U.S. Application Data

(63) Continuation of application No. 10/342,757, filed on Jan. 16, 2003, now Pat. No. 7,120,275.

(51) Int. Cl.
G06K 9/00 (2006.01)
A63F 3/00 (2006.01)
(52) U.S. Cl. .......... 382/189; 382/187; 273/237
(58) Field of Classification Search .......... 382/189
See application file for complete search history.

(56) References Cited

U.S. PATENT DOCUMENTS

| | | | | |
|---|---|---|---|---|
| 4,209,173 A * | 6/1980 | Curtis et al. | | 273/240 |
| 4,369,973 A | 1/1983 | D'Aurora et al. | | |
| 4,438,932 A * | 3/1984 | Finkel | | 273/237 |
| 5,392,130 A * | 2/1995 | Mahoney | | 358/400 |
| 5,566,942 A * | 10/1996 | Elum | | 273/153 R |
| 5,682,439 A * | 10/1997 | Beernink et al. | | 382/187 |
| 5,848,187 A | 12/1998 | Bricklin et al. | | |
| 5,871,210 A | 2/1999 | Harrison | | |
| 6,005,973 A | 12/1999 | Seybold et al. | | |
| 6,322,074 B1 | 11/2001 | Forrest et al. | | |
| 6,378,867 B1 * | 4/2002 | Shalless | | 273/240 |
| 6,393,395 B1 | 5/2002 | Guha et al. | | |
| 6,513,005 B1 | 1/2003 | Su et al. | | |
| 6,912,498 B2 | 6/2005 | Stevens et al. | | |
| 7,120,275 B2 * | 10/2006 | Landstad et al. | | 382/100 |
| 7,120,385 B2 * | 10/2006 | Marggraff | | 434/317 |
| 2003/0139210 A1* | 7/2003 | Raben | | 463/9 |
| 2003/0162162 A1* | 8/2003 | Marggraff | | 434/410 |
| 2004/0021700 A1 | 2/2004 | Iwema et al. | | |

OTHER PUBLICATIONS http://www.ehow.com/how_13518_play-hangman.html, How to Play Hangman Instructions, eHow, Inc. 1999-2009.*

(Continued)

*Primary Examiner* — David P Zarka
(74) *Attorney, Agent, or Firm* — Lee & Hayes, PLLC

(57) ABSTRACT

Methods, systems and user interfaces for providing feedback to a user based on recognition of character-based ink input are provided. A first feedback is provided to the user to indicate a character as which ink input by the user is recognized. The first feedback is displayed in proximity to the displayed input ink so that the user knows to which ink character the first feedback corresponds. A second feedback may optionally also be provided indicating a correctness of the recognized ink input, as compared to a predefined correct value such as a correct word game solution or answer, by displaying the input ink in one format to indicate that the recognized value is correct, and by displaying the input ink in a second format to indicate that the recognized value is incorrect.

10 Claims, 7 Drawing Sheets

OTHER PUBLICATIONS

Washingtonpost.com: Style Crosswords, printed from http://crosswords.washingtonpost.com/wp-srv/style/crosswords/daily/front.htm on Jan. 3, 2003, 1 page.

Literate Software System Home Page, printed from http://www.litsoft.com on Jan. 3, 2003, 2 pages.

Literate Software Systems—Across Product Line, printed from http://www.litsoft.com/across/preview.htm on Jan. 3, 2003, 2 pages.

Across Lite Product Sheet, printed from http://www.litsoft.com/across/alite/prod.htm on Jan. 3, 2003, 2 pages.

Across Lite v.1.2a (for Windows 95, NT) available for download at www.litsoft.com, 1995-1997.

* cited by examiner

INK RECOGNITION FOR USE IN CHARACTER-BASED APPLICATIONS

CROSS-REFERENCE TO RELATED APPLICATIONS

This application is a continuation of U.S. Ser. No. 10/342,757, filed Jan. 16, 2003, entitled "Ink Recognition For Use In Character-Based Applications."

FIELD OF THE INVENTION

The invention relates generally to tablet and handheld computers. More specifically, the invention relates to methods and systems for interacting with a Tablet PC during a character-based application, and for providing feedback based on the user input to indicate recognition and/or correctness of the input.

BACKGROUND OF THE INVENTION

Typical computer systems, especially computer systems using graphical user interfaces (GUI) for user interaction, such as Microsoft WINDOWS® brand operating system, are optimized for accepting user input from one or more discrete input devices for entering text (such as a keyboard), and a pointing device (such as a mouse) with one or more buttons for activating user selections. Some computing systems have expanded the input systems available to a user by providing a pen-like stylus. Using a pressure sensitive overlay or an electronic digitizer, a computer display may be enhanced to accept interaction from a user by using the stylus. For example, one may write handwritten information (referred to as ink, and further discussed below) on the display, or interact with the display by selecting icons or objects with the stylus.

Handwritten information received into a computer may be used in a variety of ways. For example, the handwritten information may remain as only handwritten information. Also, the handwritten information may be processed by a handwriting recognition engine and the information replaced by text from the handwriting recognition engine. Finally, the handwritten information may remain displayed to a user and the results of the handwriting recognition engine associated with the handwritten information (being displayed in conjunction with the handwriting information or hidden from the user, but still being associated with the handwriting information). These capabilities are available in Microsoft's WINDOWS brand XP Tablet PC Edition operating system.

The additional capability of user input via pen has introduced new interaction problems for a user when attempting to input certain data. For example, a user may attempt to write "house" on a digitizer using the stylus, but the computer might recognize the input as "mouse." The WINDOWS brand XP Tablet PC Edition provides a mechanism, referred to as the Text Input Panel, or TIP, through which a user can confirm that the computer recognizes the input as the user is writing the input on the digitizer. However, use of the TIP requires a user to open a separate window and might not always be convenient or desired depending on the application into which the user input will ultimately be placed, e.g., when the user is playing a word game. That is, if a user must use the TIP to confirm input while playing a game, the user's concentration or train of thought may often be disturbed, causing the user to have a less enjoyable game experience than if the user could confirm input directly through the game's user interface.

Thus, it would be an advancement in the art to provide a technique for inputting ink for use in word games where the user could confirm that handwritten ink input was correctly recognized by the computer. It would be a further advancement in the art to provide feedback to the user indicating whether the recognized value of the ink input is correct.

BRIEF SUMMARY OF THE INVENTION

To overcome limitations in the prior art described above, and to overcome other limitations that will be apparent upon reading and understanding the present specification, the present invention includes a user interface, systems, and methods for providing user feedback on character-based ink input, such as in a word game application or other application that accepts character-based input where each character can be independently determined to be a correct or incorrect value, independent of other characters input during the game or other application.

One aspect of the invention provides feedback to a user that includes an indication of a character recognized from the ink input. The character indication feedback is preferably displayed so that the user knows to which ink the feedback corresponds, e.g., in proximity with the displayed ink.

Another aspect of the invention provides feedback to the user based on the correctness of the recognized character. The correctness of the recognized character may be determined by comparing the recognized character with a predefined correct value, such as a game solution or answer. If the recognized character is correct, the ink may be displayed in a first format. If the recognized character is incorrect, the ink may be displayed in a second format.

In some embodiments, the input ink and feedback(s) may be replicated into related entry fields to assist the user in completing the character-based application or game objective.

BRIEF DESCRIPTION OF THE DRAWING

A more complete understanding of the present invention and the advantages thereof may be acquired by referring to the following description in consideration of the accompanying drawings, in which like reference numbers indicate like features, and wherein:

FIG. 3 illustrates an enlarged view of the answer portion of the crossword puzzle user interface illustrated in FIG. 2, with a partial answer filled in.

DETAILED DESCRIPTION OF THE INVENTION

Aspects of the present invention relate to providing a user interface and methods for inputting ink for use in games, especially for use with word games (although not required), where the user is provided dynamic real time feedback indicative of the recognized ink input, and may also be provided feedback indicative of the correctness of the recognized ink input with respect to a predefined game objective. Using the dynamic feedback, a user instantly knows whether the computer correctly recognized his or her input as that which the user meant to be recognized, and may also know whether the input was correct with respect to a game objective.

The following description is arranged into a number of subsections to assist the reader in understanding the various aspects of the invention. The subsections include: terms, general operating environment, and illustrative embodiments.

TERMS

The following terms are used throughout the specification, and are defined below for easy reference by the reader:

Ink—A sequence or set of strokes with properties. A sequence of strokes may include strokes in an ordered form. The sequence may be ordered by the time captured or by where the strokes appear on a page. Other orders are possible. A set of strokes may include sequences of strokes or unordered strokes or any combination thereof. Ink may be expanded to include additional properties, methods, and trigger events and the like. When combined with at least some of these events, it may be referred to as an ink object.

Ink object—A data structure storing an ink with or without properties, methods, and/or events.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, points may be defined relative to a capturing space (for example, points on a digitizer), a virtual ink space (the coordinates in a space into which captured ink is placed), and/or display space (the points or pixels of a display device).

Tablet PC—A computer modified to accept handwritten input via a stylus or other pen-like input device. A Tablet PC also includes any computer modified to emulate ink input, e.g., by having been modified to allow a user to input ink using the mouse or other input device instead of using a stylus in combination with a digitizer or touch-sensitive screen.

General Operating Environment

Figure 1:
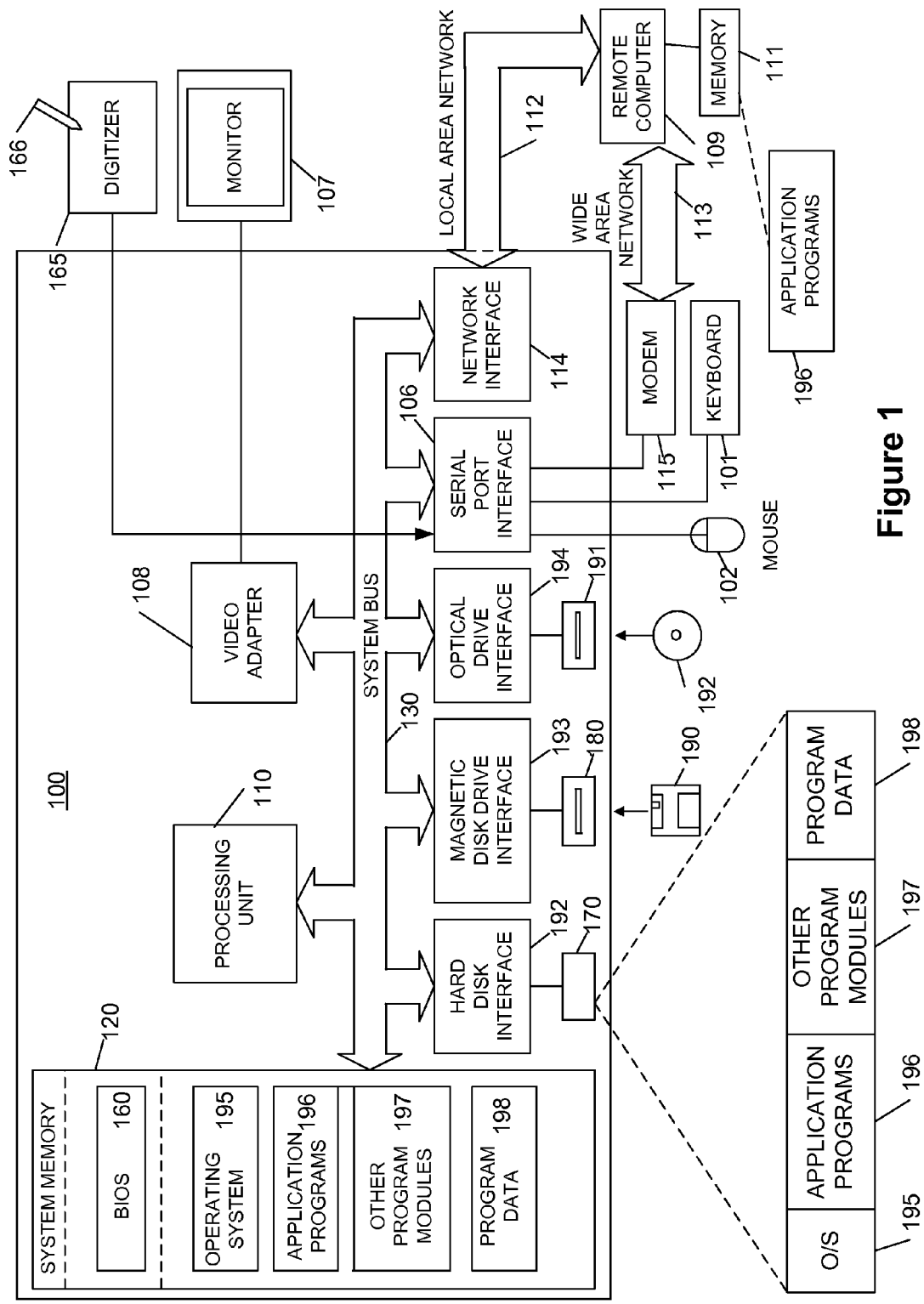
FIG. 1 illustrates a general operating environment according to an illustrative embodiment of the invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input, such as ink. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, in many embodiments of the invention, the usable input area of the digitizer 165 is co-extensive with the display area of the monitor 107. Further still, the digitizer 165 may be integrated in the monitor 107, or may exist as a separate device overlaying or otherwise appended to the monitor 107.

Application programs 196 and program modules 197 may include a parsing module and a recognition module for use in receiving and analyzing ink input via the stylus 166. The parsing module may be used to analyze received strokes and group the strokes into ink objects (e.g., characters, words, drawings, etc.). The recognition module may be used to analyze ink objects and perform character recognition on alphanumeric ink objects. The recognition information may then be stored as a property of the ink object. Parsing and recognition modules are available from Microsoft Corporation of Redmond, Wash. in the Tablet PC Platform Software Development Kit (SDK).

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet and use both wired and wireless communication protocols.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Many word games are dependent on a user, or player, determining characters or words that successfully complete the game's objective. Examples of such games include crossword puzzles, cryptograms, and hangman. For example, in a crossword puzzle, a user must successfully determine multiple words crossed horizontally and vertically, based on a clue for each word in the puzzle, such that the words intersect correctly. In a game of hangman, a user must determine a single word or phrase by guessing individual letters in the word or phrase. When a guessed letter appears in the word or phrase, the guessed letter is filled in at each appropriate location where the guessed letter appears in the word or phrase. When the guessed letter does not appear at all in the word or phrase, the player receives a strike. The game ends either when the player successfully guesses the word or phrase, or the player accumulates some predetermined number of strikes. In a cryptogram, each letter of the alphabet is substituted by another random letter of the alphabet (but no letter is ever used to replace more than one other letter). A word or phrase is then written using the replaced letters in place of the original letters of the word or phrase. The player must determine what the original word or phrase is, based on patterns of characters in words, repetition of characters, length of individual words in the phrase, and the like.

Crossword puzzles, cryptograms, and hangman, generally, are well known in the art. It will be appreciated by those of skill in the art, however, that the present invention is applicable to any game or other application where input is character-based (e.g., alphanumeric) and can be compared to some predetermined correct value (e.g., a game objective, answer, or solution). Character-based input refers to any application that receives, as input, individual characters whose correctness can be evaluated individually against a predefined correct value, independent of other input characters and without waiting for an entire word to be entered.

Figure 2:
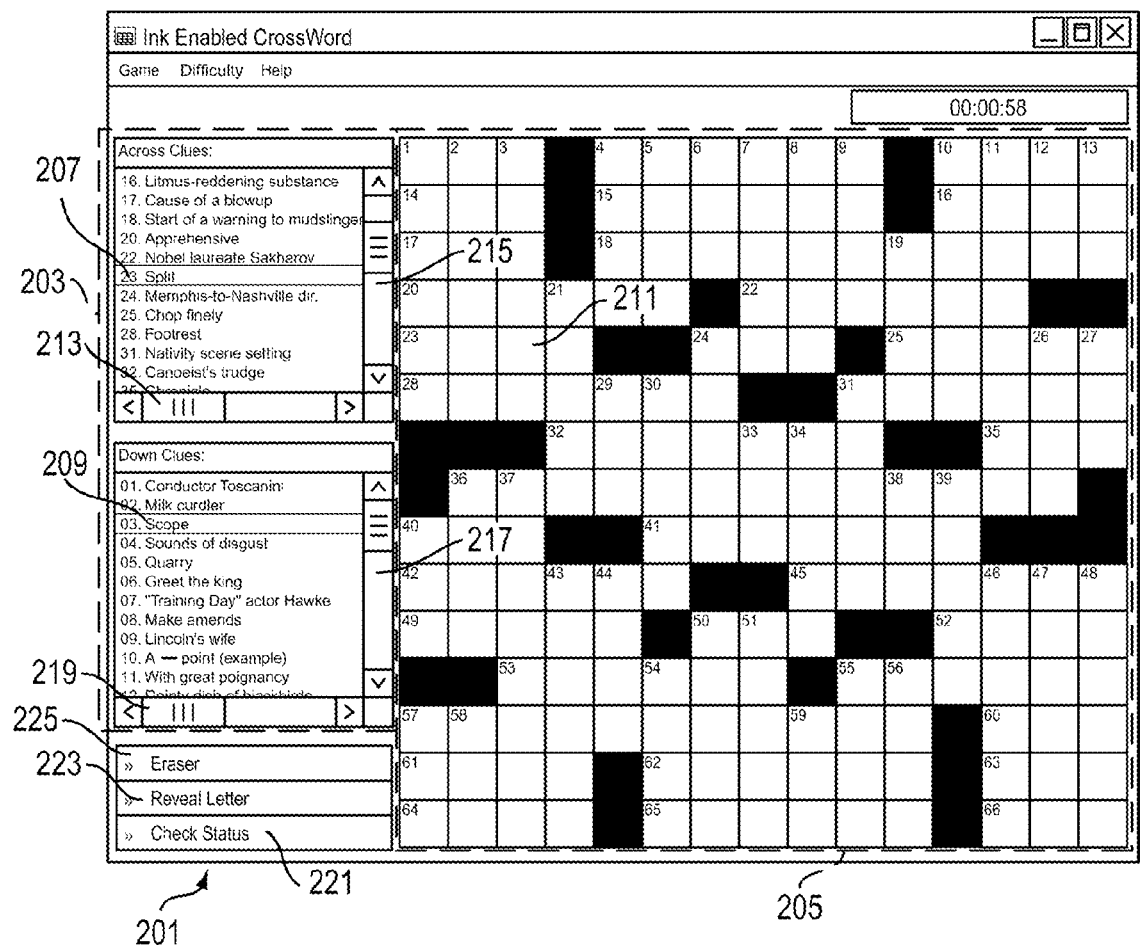
FIG. 2 illustrates a crossword puzzle user interface according to an illustrative embodiment of the invention.
Figure 3:
Figure 4:
FIG. 4 illustrates an enlarged view of the answer portion of the crossword puzzle user interface illustrated in FIG. 2, with a different partial answer filled in from that illustrated in FIG. 3.

With reference to FIGS. 2-4, a user may receive dynamic feedback based on recognized input and/or correctness of recognized input while solving a crossword puzzle on a Tablet PC. FIG. 2 illustrates a crossword puzzle user interface 201 for use with a Tablet PC, according to an illustrative embodiment of the invention. The crossword puzzle interface and operation may be controlled by a crossword puzzle application stored on the Tablet PC, e.g., as an application program 196. A crossword puzzle interface 201 may include a clue portion 203 and an answer portion 205. The clue portion 203 provides to the player a clue 207 for each word that is to be filled in by the player in the answer portion 205. When the user selects a square (other than a black square) in the answer portion 205, e.g., square 211 corresponding to clue 23-across and clue 3-down, the corresponding clues 207 and 209 for the horizontal and vertical words, respectively, corresponding to square 211 may be automatically displayed in the clue portion 203. Alternatively, a player may browse clues using scroll bars 213, 215, 217, and 219. Check button 221 may be used to check the player's answers when dynamic feedback as described below is turned off. Reveal button 223 may be used to reveal an answer or answers to the player when the player is stuck and cannot figure it out on his or her own. Reveal button 223 may alternatively incorporate a drop down list that allows the player to select whether the current character, word, or entire puzzle should be revealed.

FIG. 3 illustrates an enlarged portion of the answer portion 205 illustrated in FIG. 2, including square 211 and its surrounding region. In FIG. 3 the player has entered an answer to clue 23-across by entering a handwritten character in each box for 23-across. As the crossword puzzle application receives and parses the input, the parsed ink 301, 303, 305 and 307 may be displayed in each respective box to indicate to the player that an answer has been entered. Upon performing recognition for each ink object, the crossword puzzle application may display a first feedback in the form of a recognition character 311, 313, 315, and 317 for each ink object 301, 303, 305, and 307, respectively, indicating the character that the crossword puzzle application recognized from the ink object. By indicating to the user the recognized input, the user knows when his or her input was recognized incorrectly. In FIG. 3, it appears as if the crossword puzzle application recognized the input ink correctly, with the exception of ink object 307, which the player intended to be an 'R', but which was recognized as a 'D'. Thus, upon receiving the first feedback, the user can go back and correct his or her input ink object 307 so that it is recognized as an 'R', if desired.

Optionally, the crossword puzzle application may display a second form of feedback indicating a correctness of the player's answer. The correctness feedback may include displaying the ink objects 301, 303, 305, and 307 and/or recognition characters 311, 313, 315, and 317 in a first format (e.g., a first color, bold, etc.) when the recognized character is correct (i.e., it matches the predetermined answer, solution, or game objective), and in a second format (e.g., a second color, non-bold, etc.) when the recognized character is incorrect. For example, in FIG. 3, ink objects 301 and 305 may be displayed red to indicate that recognized characters T and A, respectively, are incorrect with respect to the correct solution, and ink objects 303 and 307 may be displayed green to indicate that recognized characters 313 and 317, E and D, respectively, are correct. When this form of feedback is turned on, it is possible for the user to repeatedly guess an answer until the correct answer is indicated. For example, while the player intended for ink object 307 to be an 'R', the player fortunately finds out that the misrecognized character 'D' is actually part of the correct solution. The user can thus use this information to help deduce the correct answer.

Upon seeing the indication of the incorrect answers, the player may choose to erase the incorrect ink input using known Tablet PC eraser methods (e.g., as distributed with the Tablet PC Platform SDK or included within Microsoft Windows XP Tablet PC Edition), or by selecting the eraser button 225 (FIG. 2) and then selecting the letters to erase using the stylus. The player may then enter another answer, e.g., the correct answer, as illustrated in FIG. 4. In FIG. 4 the entire answer ("REND") may be displayed green to indicate that the answer is correct.

Figure 5:
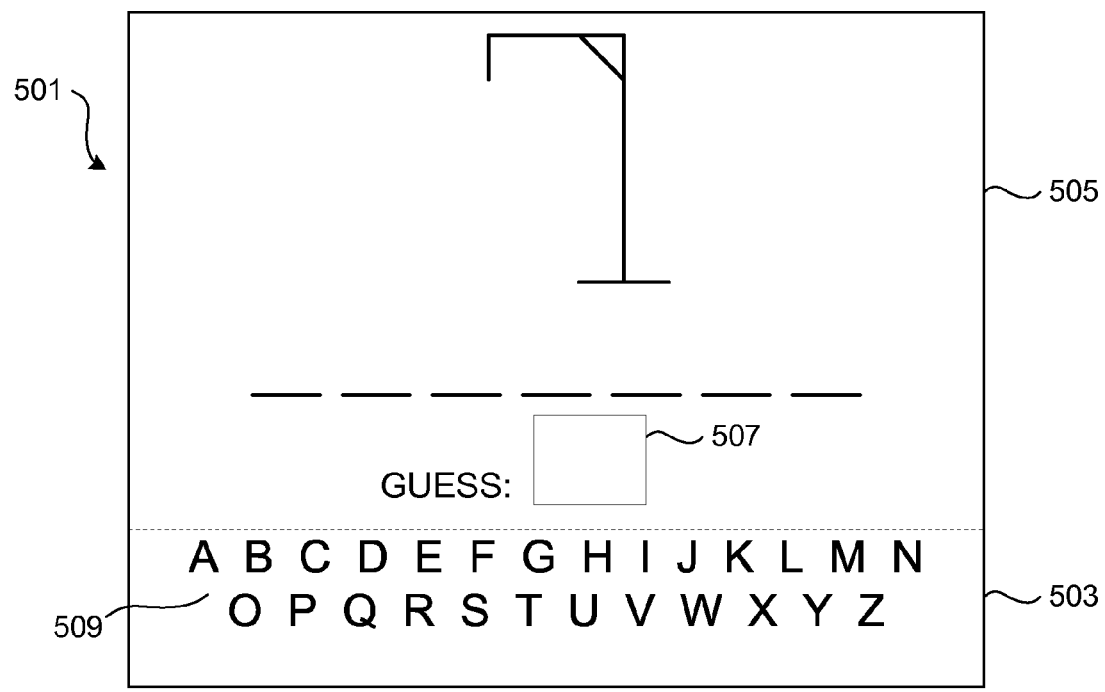
FIG. 5 illustrates a hangman user interface according to an illustrative embodiment of the invention.
Figure 6:
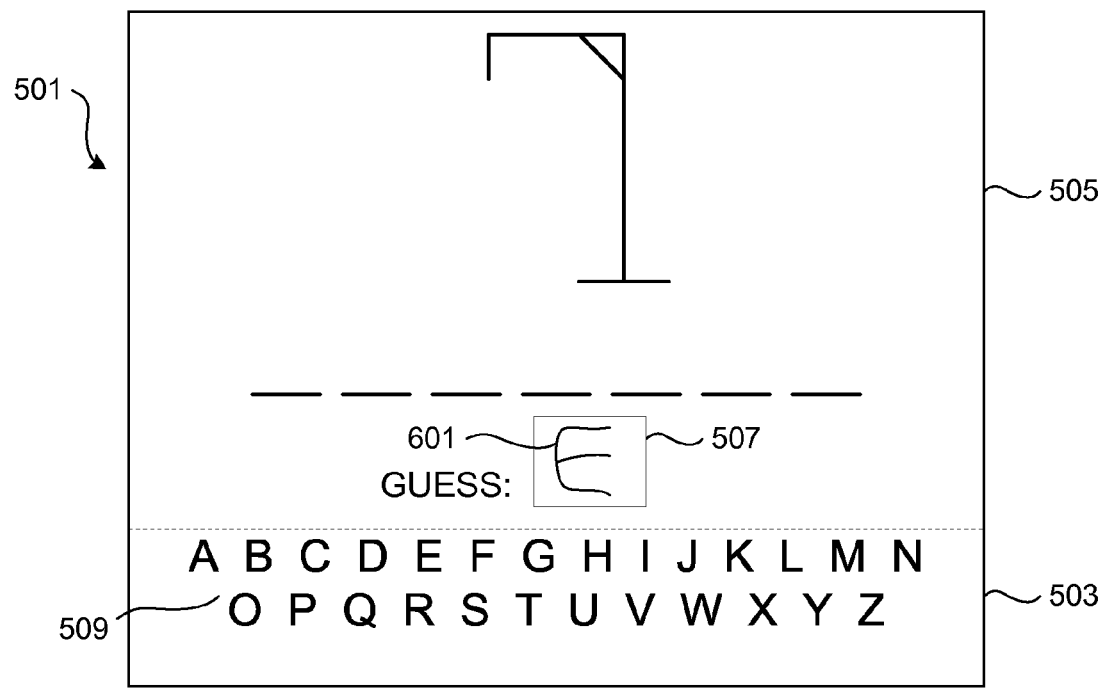
FIG. 6 illustrates the hangman user interface with user input according to an illustrative embodiment of the invention.
Figure 7:
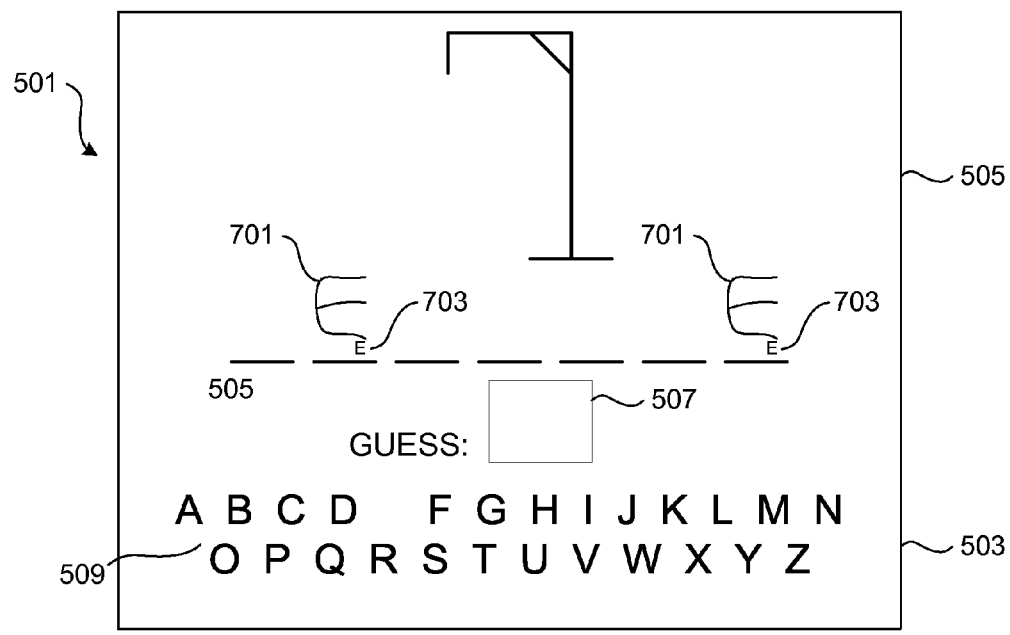
FIG. 7 illustrates the hangman user interface with parsed and recognized user input according to an illustrative embodiment of the invention.

With reference to FIGS. 5-7, aspects of the present invention are again illustrated with respect to a hangman game application. In FIG. 5, a hangman user interface 501 may include a clue portion 503 and an answer portion 505. Because the game of hangman consists of merely guessing letters to an answer word or phrase, clue portion 503 may simply include a list 509 of not-yet-guessed letters. Optionally (not shown), clue portion 503 may include a hint to help the user guess the correct word or phrase. Answer portion 505 may include a blank location for each character of the answer word or phrase, so that the player knows how long the word or phrase is, and an input box 507 for the user to guess a letter by entering handwritten input using the stylus.

In FIG. 6, a player guesses a letter by writing the guessed letter 601 in the input box 507, e.g., the letter 'E'. The hangman application parses the input ink and performs recognition on the parsed ink. Once recognized, the hangman application removes the recognized letter from the list 509 of unguessed letters. The user knows whether the input ink was recognized correctly based on the letter removed from the list of letters. The hangman application then performs one of two actions. The first action is performed when the recognized letter is not in the word or phrase. The hangman application increments the strike count against the player, for example by drawing a portion of a person above the entry blanks (not shown).

With reference to FIG. 7, the second action is performed when the recognized letter is in the answer word or phrase. The hangman application displays the entered ink object 701 in each entry blank location in which the recognized letter appears in the answer word or phrase. In addition, the hangman application displays the first form of feedback by displaying an indication 703 of the recognized letter next to each displayed ink object 701. Optionally, the hangman application may display a second form of feedback by displaying the ink object 701 and/or indication 703 in a format to indicate its correctness, as described above. However, because the ink object is only displayed in the answer word or phrase if the recognized letter is a correct guess, the second form of feedback is unnecessary in the hangman application.

Figure 8:
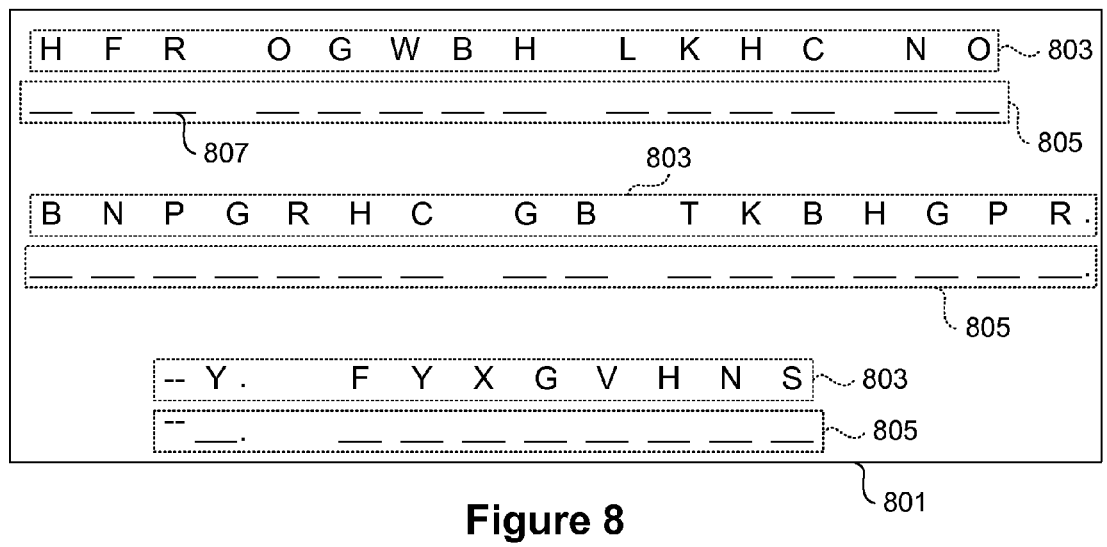
FIG. 8 illustrates a cryptogram user interface according to an illustrative embodiment of the invention.
Figure 9:
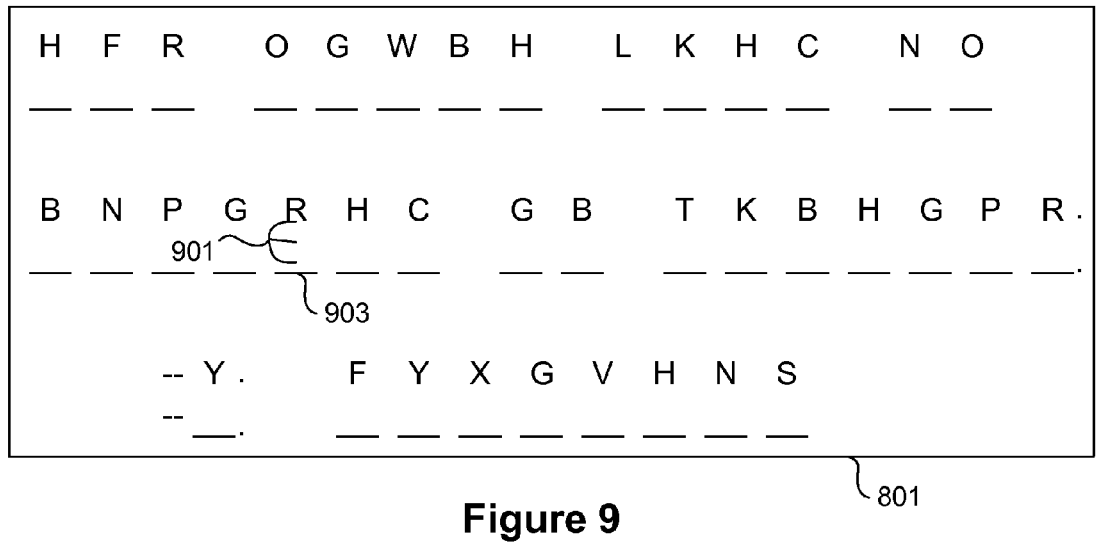
FIG. 9 illustrates the cryptogram user interface with user input according to an illustrative embodiment of the invention.
Figure 10:
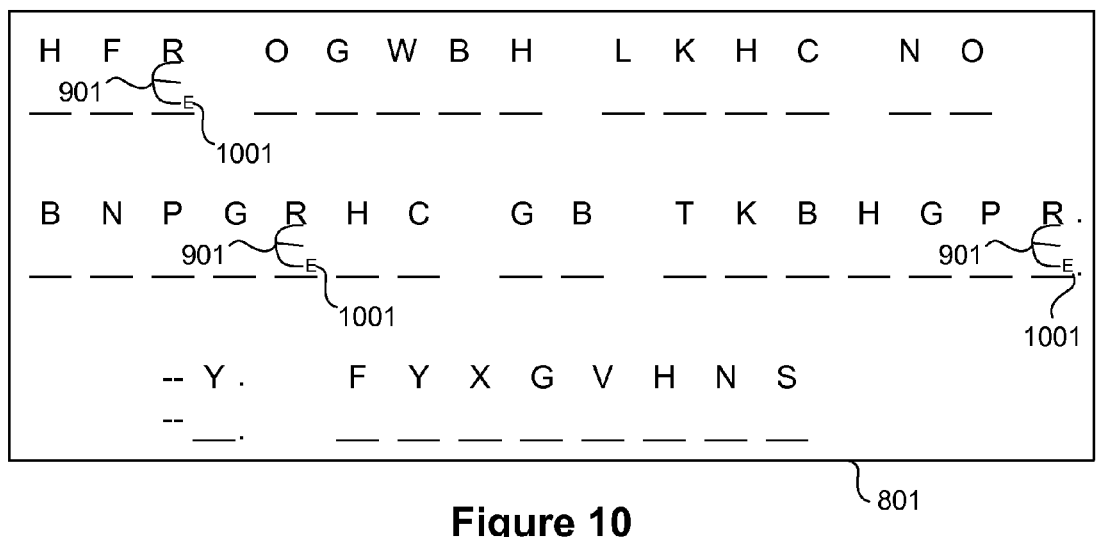
FIG. 10 illustrates the cryptogram user interface with parsed and recognized user input according to an illustrative embodiment of the invention.

With reference to FIGS. 8-10, aspects of the present invention may also be used with a cryptogram game application. A cryptogram user interface 801 includes a clue portion 803 and answer portion 805. In a cryptogram, the clue portion includes a word or phrase where each unique letter of the alphabet is substituted by another unique letter of the alphabet. The answer portion includes an entry blank 807 for each letter in the word or phrase. The clue portion 803 may optionally include a hint (not shown) to aid the player in solving the cryptogram. In the present example, an applicable hint might read "Quotation by the principal author of The Federalist."

As illustrated in FIG. 9, a player inputs a letter by writing a letter 901 in an entry blank 807. For example, the player may input the letter 'E' in entry blank 903. The cryptogram application parses the input and performs recognition on the ink. Upon performing recognition on the ink, with reference to FIG. 10, the cryptogram application displays first feedback 1001 to indicate the letter as which the ink 901 is recognized. In addition, the cryptogram application may replicate the ink 901 and feedback 1001 into other entry blanks corresponding to the same letter as that for which ink 901 was entered. The cryptogram application may optionally also display second feedback to indicate the correctness of recognized letter 1001 by displaying ink 901 and/or feedback 1001 in a first format (e.g., a first color, italicized, etc.) when the recognized letter is correct with respect to the cryptogram solution, and displaying ink 901 and/or feedback 1001 in a second format (e.g., a second color, non-italicized, etc.) when the recognized letter is incorrect with respect to the cryptogram solution. In the present example the letter 'E' correctly corresponds to the clue letter 'R', so the ink objects 901 would be displayed in the first format (e.g., green). However, if the letter 'E' did not correspond to clue letter 'R', ink objects 901 would be displayed in the second format (e.g., red). Just as the cryptogram application may replicate input into like entry blanks, the cryptogram application may also delete like input when the player erases an entry.

Figure 11:
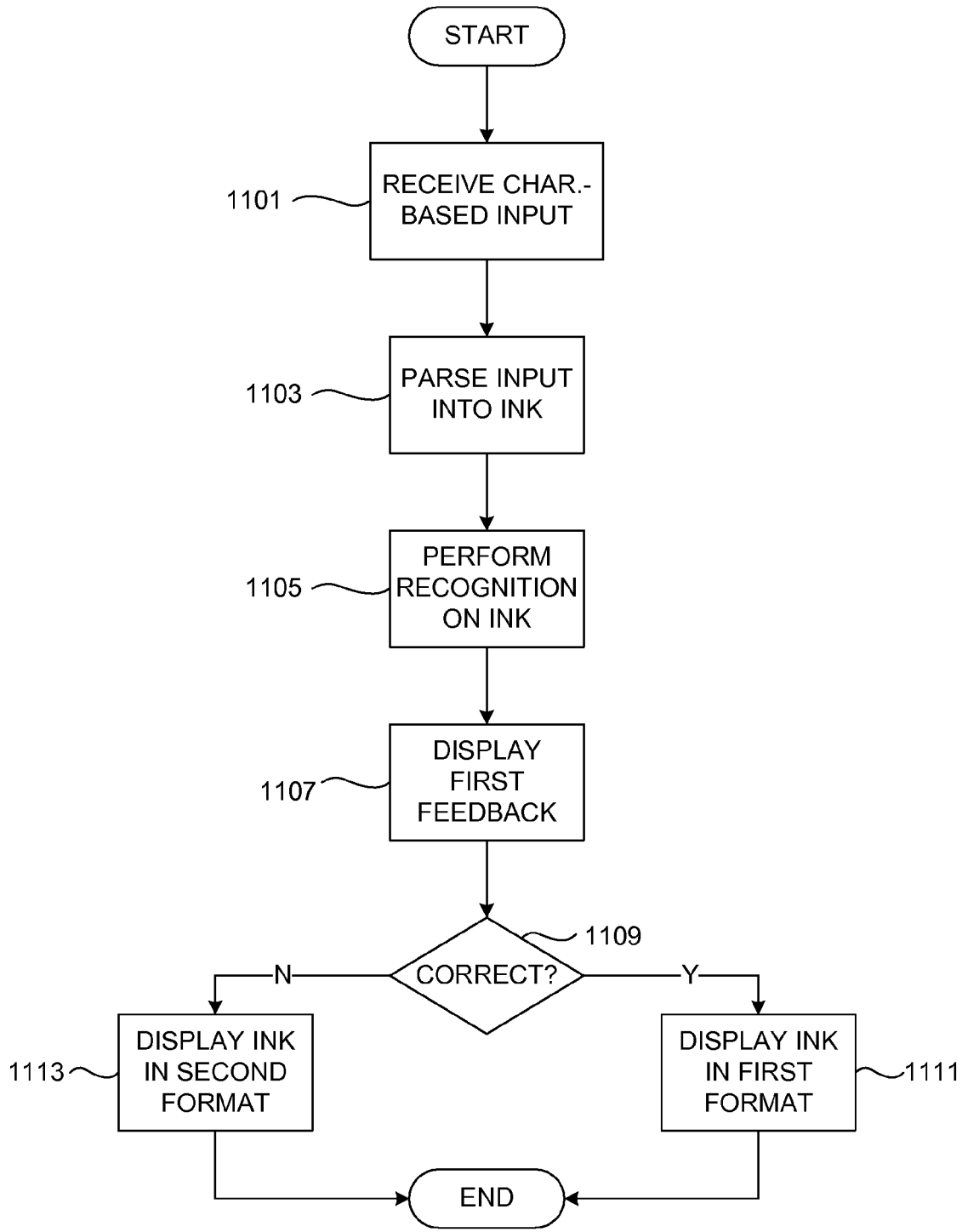
FIG. 11 illustrates a method for displaying feedback for use with character-based ink input according to an illustrative embodiment of the invention.

FIG. 11 illustrates a general method for displaying feedback based on ink recognition. In step 1101, a Tablet PC receives character-based handwritten input for an application or game. Character-based input refers to any input in which the correctness of the input can be measured on a character-by-character basis, instead of requiring an entire word to be entered before comparing the input to a predefined correct entry. In step 1103 the Tablet PC parses the input into an ink object, and in step 1105 performs recognition on the parsed ink object. After performing recognition on the ink object, the Tablet PC displays first feedback indicative of the letter recognized from the ink object. The first feedback is preferably located in proximity to the input ink object so that a user knows which ink object to which the feedback corresponds. If the input ink object is not recognized in step 1105, the first feedback might include an error message, or displaying an indication that the ink object was not recognized, e.g., by displaying a question mark (?) or some other special character as the first feedback.

In step 1109 the Tablet PC, or an application running on the Tablet PC (e.g., a game) determines whether the recognized input ink object is correct with respect to a predefined correct value (e.g., a game objective, such as a correct solution or answer). If the recognized input ink object is correct, the Tablet PC or application displays in step 1111 the ink object and/or the first feedback in a first format, e.g., a first color, italicized, bold, etc. If the recognized input ink object is incorrect, the Tablet PC or application displays in step 1113 the ink object and/or the first feedback in a second format, e.g., a second color, non-italicized, non-bold, etc. Those of skill in the art will appreciate that some method steps may be performed in other than the recited order, and that some method steps may be optional or combined with other method steps.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. A computer-implemented method for providing feedback indicative of ink recognition in an application that accepts character-based ink input, comprising:
    under control of one or more computing devices configured with executable instructions:
        performing recognition on ink to determine a character to which the ink corresponds on a character by character basis;
        displaying the ink in a plurality of related entry locations;
        automatically displaying a first feedback in each of the plurality of related entry locations, wherein the first feedback provides an indication of the character to which the ink corresponds based on performance of the recognition, independent of other character ink input;
        comparing recognized ink from the performance of the recognition to a predefined correct value corresponding to the plurality of related entry locations; and
        displaying a second feedback indicative of a correctness or incorrectness of the recognized ink relative to the predefined correct value.

2. The computer-implemented method of claim 1, wherein the correctness of the recognized ink relative to the predefined correct value is in a first format.

3. The computer-implemented method of claim 2, wherein the first format comprises one or more of a group comprising color, font or text emphasis.

4. The computer-implemented method of claim 1, wherein the incorrectness of the recognized ink relative to the predefined correct value is in a second format.

5. The computer-implemented method of claim 4, wherein the second format comprises one or more of a group comprising color, font or text emphasis.

6. A computer-implemented method for providing feedback indicative of ink recognition in an application that accepts character-based ink input, comprising:
    employing a processor that executes instructions retained in a computer-memory, the instructions when executed by the processor implement operations including:
        performing recognition on ink to determine a character to which the ink corresponds on a character by character basis;
        displaying the ink in a plurality of related entry locations;
        automatically displaying a first feedback in each of the plurality of related entry locations, wherein the first feedback provides an indication of the character to which the ink corresponds based on performance of the recognition, independent of other character ink input;
        comparing recognized ink from the performance of the recognition to a predefined correct value corresponding to each of the plurality of related entry locations; and
        displaying a second feedback indicating a correctness of the recognized ink relative to the predefined correct value in a first format and incorrectness of the recognized ink in a second format.

7. One or more computer readable media storing computer readable instructions defining a user interface for display on a display device through which a user interacts with a word game application that accepts character-based input, said user interface comprising:
    a clue portion comprising a clue to the solution of a word game, wherein the word game comprises one of a crossword puzzle and the predefined correct value includes a partial solution to the crossword puzzle and a cryptogram and the predefined correct value includes a partial solution to the cryptogram;
    an answer portion comprising an entry blank displaying ink input by a user;
    a first feedback automatically displayed in proximity to the ink input by the user, including an indication of a character recognized on a character by character basis from the ink input, independent of other character ink input; and
    a second feedback automatically displayed indicating a correctness of the ink input based on a comparison of the recognized character to a predefined correct value in a first format and indicating an incorrectness of the ink input in a second format.

8. The computer readable media of claim 7, wherein the second feedback comprises one or more of a group comprising color, font or text emphasis.

9. The computer readable media of claim 7, wherein the second feedback automatically displayed indicating an incorrectness of the ink input based on a comparison of the recognized character to a predefined correct value.

10. The computer readable media of claim 9, wherein the second feedback comprises one or more of a group comprising color, font or text emphasis.

* * * * *